(12) United States Patent
Simonutti et al.

(10) Patent No.: US 11,192,001 B2
(45) Date of Patent: Dec. 7, 2021

(54) TENNIS BALL HAVING A THERMOPLASTIC CORE

(71) Applicant: Wilson Sporting Goods Co., Chicago, IL (US)

(72) Inventors: Frank M. Simonutti, Wheaton, IL (US); Chloe J. Lee, Chicago, IL (US); Robert T. Thurman, Glenn Ellyn, IL (US); William E. Dillon, Chicago, IL (US); David A. Vogel, Island Lake, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 16/787,448

(22) Filed: Feb. 11, 2020

(65) Prior Publication Data
US 2021/0245014 A1    Aug. 12, 2021

(51) Int. Cl.
*A63B 39/00* (2006.01)
*A63B 102/02* (2015.01)
*A63B 43/00* (2006.01)
*B29D 22/04* (2006.01)

(52) U.S. Cl.
CPC ........ *A63B 39/00* (2013.01); *A63B 2039/003* (2013.01); *A63B 2039/006* (2013.01); *A63B 2043/001* (2013.01); *A63B 2102/02* (2015.10); *A63B 2209/00* (2013.01); *B29D 22/04* (2013.01)

(58) Field of Classification Search
CPC .............. A63B 39/00; A63B 2043/001; A63B 2209/00; A63B 2039/003; A63B 2102/02; A63B 2039/006; B29D 22/04

USPC ......................................................... 473/597
See application file for complete search history.

(56) References Cited

U.S. PATENT DOCUMENTS

| | | | |
|---|---|---|---|
| 398,558 A | 2/1889 | Waddington | |
| 902,330 A | 10/1908 | Rowley | |
| 1,376,778 A | 5/1921 | Orr | |
| 2,210,954 A | 8/1940 | Roberts | |
| 2,325,128 A * | 7/1943 | Grady | A63B 37/00 473/597 |
| 3,065,520 A | 11/1962 | Schmidt | |
| 3,256,019 A * | 6/1966 | Barton | A63B 37/0097 473/597 |
| 3,396,970 A | 8/1968 | Fraser, Jr. et al. | |
| 3,442,101 A | 5/1969 | Ploch et al. | |
| 3,684,284 A | 8/1972 | Tranfield | |
| 3,904,201 A | 9/1975 | Henry | |

(Continued)

FOREIGN PATENT DOCUMENTS

| | | |
|---|---|---|
| EP | 0022961 | 1/1981 |
| EP | 0456036 A1 | 11/1991 |

(Continued)

*Primary Examiner* — Steven B Wong
(74) *Attorney, Agent, or Firm* — Terence P. O'Brien; Todd A. Rathe

(57) ABSTRACT

A tennis ball including a non-foamed thermoplastic core defining an internal volume. The core includes a thermoplastic material having a specific gravity of 0.86 to 1.38, a flexural modulus of 2.0 to 50.0 MPa, and a Shore D hardness of 10 to 70. A thickness of the thermoplastic material is between 3.0 and 8.0 mm. The thickness of the thermoplastic material is configured to maintain dimensional stability at internal pressures of between zero and 15 psi.

31 Claims, 8 Drawing Sheets

(56) References Cited

U.S. PATENT DOCUMENTS

| | | | |
|---|---|---|---|
| 4,022,469 A | 5/1977 | Lacoste et al. | |
| RE29,303 E | 7/1977 | Fraser, Jr. et al. | |
| 4,098,504 A | 6/1978 | Koziol et al. | |
| 4,124,117 A | 11/1978 | Rudy | |
| 4,145,045 A * | 3/1979 | Pocklington | C08L 21/00 473/606 |
| 4,151,029 A * | 4/1979 | Jones-Hinton | B29D 22/04 156/145 |
| 4,187,134 A * | 2/1980 | Svub | A63B 41/10 156/147 |
| 4,241,118 A * | 12/1980 | Skelton | A63B 39/08 156/213 |
| 4,249,730 A * | 2/1981 | Frisk | A63B 39/00 273/DIG. 20 |
| 4,300,767 A | 11/1981 | Reed et al. | |
| 4,305,583 A | 12/1981 | Tandon et al. | |
| 4,306,719 A * | 12/1981 | Haines | A63B 45/00 473/606 |
| 4,318,875 A | 3/1982 | Shrimpton et al. | |
| 4,340,222 A | 7/1982 | Kerkenbush et al. | |
| 4,580,781 A * | 4/1986 | Horiuchi | A63B 39/00 473/606 |
| 4,616,828 A | 10/1986 | Haythornthwaite | |
| 4,853,056 A | 8/1989 | Hoffman | |
| 4,853,057 A | 8/1989 | Hoffman | |
| 4,946,166 A | 8/1990 | Horiuchi et al. | |
| 4,947,466 A * | 8/1990 | Horiuchi | A63B 39/00 273/DIG. 20 |
| 4,978,717 A * | 12/1990 | Hazelton | C08L 11/00 525/195 |
| 5,209,471 A * | 5/1993 | Horiuchi | A63B 39/00 260/998.14 |
| 5,211,788 A | 5/1993 | Song | |
| 5,225,258 A * | 7/1993 | Nakamura | A63B 39/00 428/36.8 |
| 5,308,060 A * | 5/1994 | Nakamura | A63B 39/06 442/324 |
| 5,310,178 A * | 5/1994 | Walker | A63B 41/08 273/DIG. 8 |
| 5,314,555 A * | 5/1994 | Fukazawa | A63B 37/0003 156/146 |
| 5,413,333 A | 5/1995 | Janes et al. | |
| 5,460,367 A * | 10/1995 | Horiuchi | A63B 39/00 473/604 |
| 5,551,688 A | 9/1996 | Miller | |
| 5,558,325 A * | 9/1996 | Hargis | A63B 39/00 273/DIG. 4 |
| 5,593,157 A | 1/1997 | Koros et al. | |
| 5,816,943 A * | 10/1998 | Masutani | A63B 37/0003 473/365 |
| 5,830,092 A | 11/1998 | Meeks | |
| 5,848,690 A | 12/1998 | Granger et al. | |
| 5,902,191 A * | 5/1999 | Masutani | A63B 37/0003 473/365 |
| 5,931,752 A * | 8/1999 | Guenther | A63B 41/08 473/597 |
| 6,030,304 A * | 2/2000 | Simonutti | A63B 39/00 473/604 |
| 6,106,419 A | 8/2000 | Hall et al. | |
| 6,123,633 A * | 9/2000 | Guenther | A63B 41/08 473/596 |
| 6,206,795 B1 * | 3/2001 | Ou | A63B 41/08 473/599 |
| 6,227,992 B1 | 5/2001 | Brasier | |
| 6,508,732 B1 | 1/2003 | Romberger et al. | |
| 6,592,477 B1 * | 7/2003 | Yang | A63B 37/12 473/597 |
| 6,677,257 B2 | 1/2004 | Brasier | |
| 7,611,429 B2 | 11/2009 | O'Neill et al. | |
| 7,985,779 B2 | 7/2011 | Vleghert | |
| 8,029,394 B2 | 10/2011 | Burke | |
| D668,947 S | 10/2012 | Niksich | |
| 8,771,375 B2 | 7/2014 | Rodengen et al. | |
| 9,675,847 B2 | 6/2017 | Jahnigen et al. | |
| 10,493,327 B2 | 12/2019 | Simonutti et al. | |
| 10,549,159 B2 | 2/2020 | Simonutti et al. | |
| 2005/0026521 A1 | 2/2005 | Brasier | |
| 2007/0100089 A1 | 5/2007 | Nesbitt et al. | |
| 2009/0318251 A1 | 12/2009 | Limerkens et al. | |
| 2010/0035711 A1 * | 2/2010 | Lo | A63B 43/008 473/604 |
| 2010/0261563 A1 | 10/2010 | Verbeke et al. | |
| 2010/0307637 A1 | 12/2010 | Dirst | |
| 2011/0224021 A1 * | 9/2011 | Tutmark | A63B 45/00 473/376 |
| 2012/0165143 A1 * | 6/2012 | Kanda | A63B 39/06 473/606 |
| 2012/0298050 A1 | 11/2012 | Merritt | |
| 2013/0017912 A1 | 1/2013 | DeAngelis-Duffy | |
| 2013/0059683 A1 * | 3/2013 | Krysiak | A63B 41/02 473/597 |
| 2018/0264326 A1 | 9/2018 | Simonutti et al. | |
| 2018/0264327 A1 | 9/2018 | Simonutti et al. | |
| 2019/0127560 A1 * | 5/2019 | Hyodo | A63B 39/00 |
| 2020/0070010 A1 * | 3/2020 | Dillon | A63B 39/025 |

FOREIGN PATENT DOCUMENTS

| | | | |
|---|---|---|---|
| EP | 0459436 A1 | 12/1991 | |
| EP | 0576233 | 12/1993 | |
| EP | 0646396 | 4/1995 | |
| FR | 2638375 | 5/1990 | |
| FR | 2640880 | 6/1990 | |
| FR | 2640880 A1 * | 6/1990 | A63B 39/00 |
| GB | 719467 | 12/1954 | |
| GB | 2038643 A | 7/1980 | |
| WO | 2015056193 | 4/2015 | |

* cited by examiner

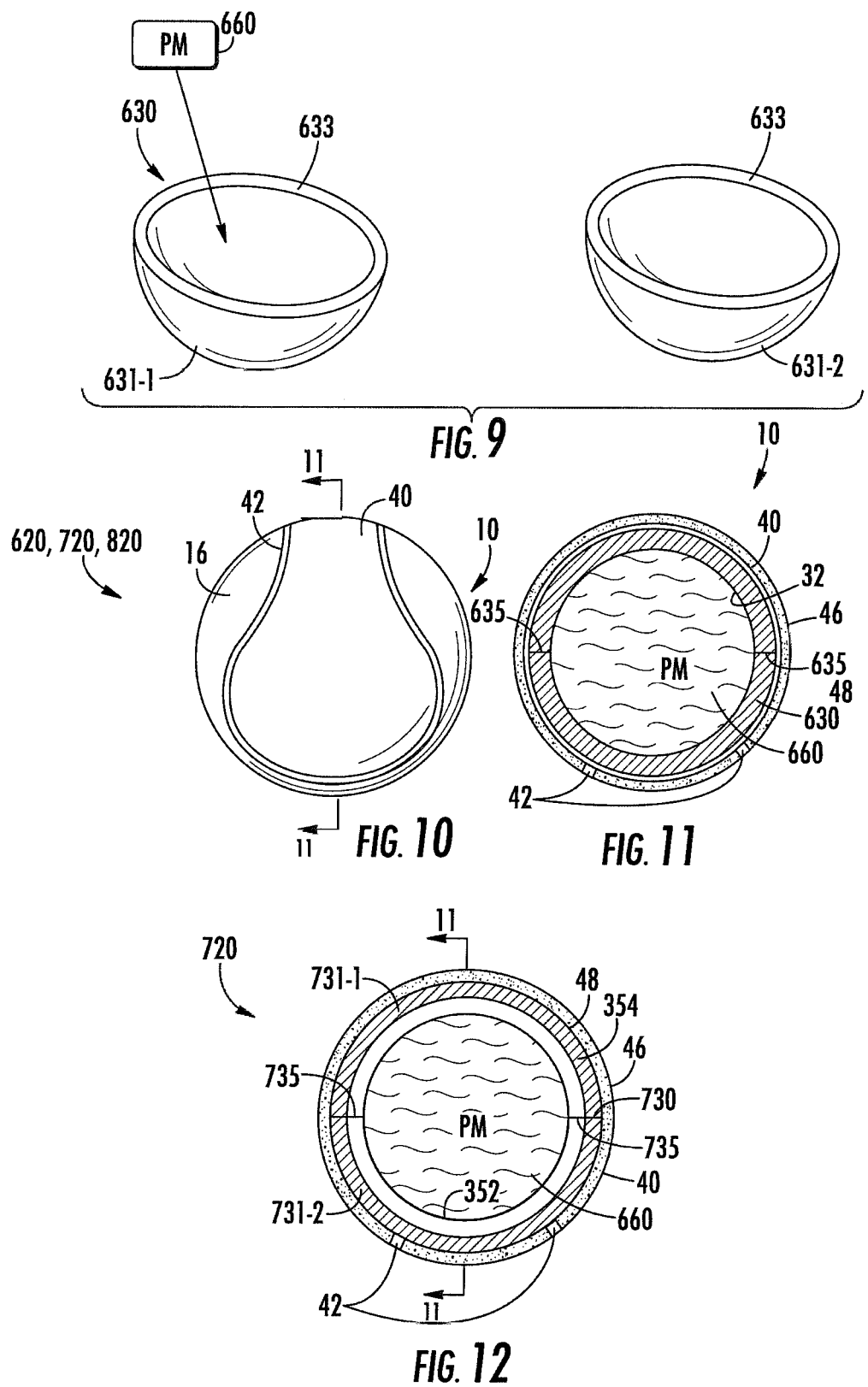

TENNIS BALL HAVING A THERMOPLASTIC CORE

BACKGROUND

Tennis balls conventionally include a hollow rubber core and a felt cover. The majority of tennis balls are "pressurized", which results in high rebound and results in ball performance necessary for optimum performance. A pressurized ball generally has an internal pressure of about 10 to 15 psi. Balls used for play are generally pressurized tennis balls.

Pressureless tennis balls are also available. Pressureless balls have minimal or no internal pressure in the core. Pressureless tennis balls generally do not exhibit the performance of a standard pressurized tennis ball. Pressureless tennis balls generally do not have the same rebound, coefficient of restitution (C.O.R.) or feel as a pressurized tennis ball. Pressureless tennis balls are generally used as practice balls and not typically utilized in competitive play.

In the case of both pressurized and pressureless tennis balls, the process of molding the tennis balls is cumbersome and labor intensive.

BRIEF DESCRIPTION OF THE DRAWINGS

FIG. 9 is an exploded perspective view of an example thermoplastic core of an example tennis ball.

FIG. 10 is a side view of an example tennis ball including the example thermoplastic core of FIG. 9.

FIG. 11 is a sectional view of one example of the tennis ball of FIG. 10.

FIG. 12 is a sectional view of another example of the tennis ball of FIG. 10.

FIG. 21B-1 is a sectional view illustrating one implementation of the core, raised wall and cover panels following at least partial melting of the raised wall and portions of at least one of the core and cover panels.

FIG. 21B-2 is a sectional view illustrating another implementation the core, raised wall and cover panels of FIG. 21B-1 following at least partial melting of the raised wall and portions of at least one of the core and cover panels, wherein thermoplastic material of the raised wall has melted and flowed within the fibers of the cover panels.

Figure 1:
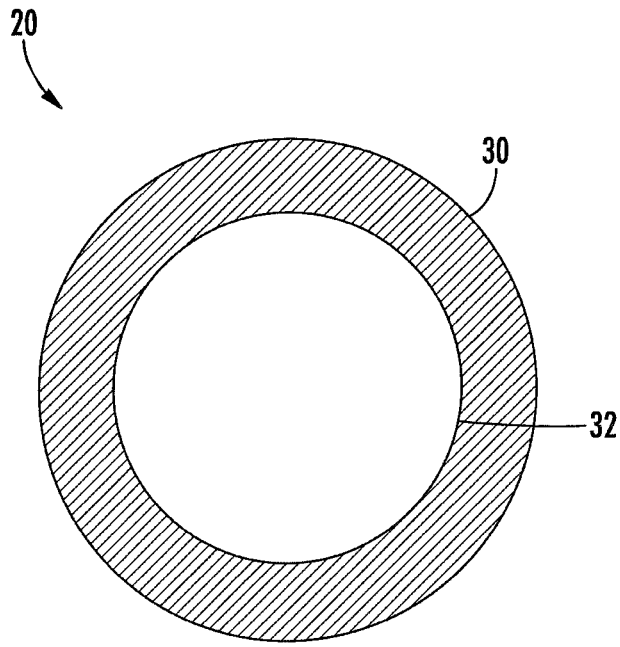
FIG. 1 is a sectional view of a hollow thermoplastic core of an example tennis ball.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are tennis balls having a construction that may reduce manufacturing steps, that may reduce manufacturing complexity and cost, that may be pressureless, that may facilitate recycling of the tennis ball and that may facilitate illumination and other advantages while conforming to ITF and USTA size, weight, deformation and rebound requirements. In some implementations, the disclosed tennis balls comprise a non-foamed thermoplastic core composition that exhibits rebound within the specifications of a conventional rubber tennis ball core. The tennis ball can be either pressureless or pressurized and either can be designed to meet the performance of a premium tennis ball. The tennis ball core composition is non-inflatable (valveless) and is designed to maintain constant size and shape at internal pressures of from 0 to 25 psi.

Disclosed are example tennis balls comprising a non-foamed hollow thermoplastic core. The core comprises a thermoplastic material having a specific gravity of 0.86 to 1.38, a flexural modulus of 2.0 to 50.0 MPa, and a Shore D hardness of 10 to 70. The core has a thickness of the thermoplastic material of between 3.0 and 8.0 mm, the thickness of the thermoplastic material configured to maintain dimensional stability at internal pressures of between zero and 15 psi. In one such implementation, the disclosed tennis balls conform to ITF and USTA size, weight, deformation and rebound requirements. In particular, the disclosed tennis balls satisfy the following requirements:

Size: 2.57 inches-2.70 inches (65.4-68.6 mm)
Weight: 56.0 g-59.4 g
Deformation: 0.220 inch-0.290 inch
Rebound: 54.0 inches-60.0 inches The ITF and USTA tennis ball rebound test specifies dropping a tennis ball is dropped from a height of 100 inches onto a concrete floor and recording the height of the rebound, measured from the bottom of the ball.

In one implementation, the material of the thermoplastic core of the example tennis balls comprise a non-foamed thermoplastic material. The thermoplastic material may comprise a blend of one or more of the following materials:

polyethylene, ethylene-alkene copolymers, ethylene-carboxylic acid copolymers, ethylene-carboxylic acid-alkyl acrylate terpolymers, metal ion-neutralized ethylene-carboxylic acid copolymers or terpolymers, nylon, polyester, or other thermoplastic materials. The thermoplastic material can be translucent or transparent, can take a natural color or can be pigmented with color concentrate to achieve a desired cosmetic appearance.

In some implementations, the spherical core may be formed from multiple layers. In some implementations, the multiple layers may be formed from different materials. In some implementations, the multiple layers may be formed from one thermoplastic material or two or more different thermoplastic materials. For example, in one implementation, the spherical core may be formed from an inner spherical layer formed from a first thermoplastic material having a first melting point and an outer spherical layer, extending over the inner spherical layer. The outer spherical layer can be formed from a second thermoplastic material having a second melting point that is lower than the first melting point. In another implementation, the spherical core may be formed from a first spherical layer formed from a first thermoplastic material having a first melting point and an outer portion that can extend over a portion or all of the first spherical layer. The outer portion can be formed from a second thermoplastic material having a second melting point that is lower than the first melting point. In such implementations, the outer layer or outer portion may be heated to a temperature above its second lower melting point to facilitate fusion to fibers, a textile material or a thermoplastic backing or scrim backing of a textile or fibrous panel (described hereafter) without meeting or exceeding the first higher melting point of the inner layer, preserving the integrity of the inner layer.

The disclosed example tennis balls may each include a high friction, soft surface extending over the spherical core. In some implementations, the high friction surface may be provided by panels, such as dog bone shaped panels or stadium shaped panels of textile or fibrous material. The panels may have a polymeric or thermoplastic backing or a scrim backing, which can be heated, melted and fused to a thermoplastic surface of the spherical core. In other implementations, the panels may be adhesively bonded to the spherical core. In some implementations, the edges of the panels may be coated with a thermoplastic material that melts upon being heated to fuse the edges of adjacent panels to one another, forming seams between the panels. In yet other implementations, the edges of the panels may be coated with a thermoset material or an adhesive to secure adjacent panel edges to one another, forming seams between the panels.

In some implementations, the panels may comprise a felt cover. In some implementations, the felt cover may comprise a woven fiber material. In other implementations, the felt cover may comprise a non-woven fiber material. In one implementation, the felt cover may comprise a needle-punch fiber material. In still other implementations, the panels or covers may comprise a non-felt material. In still other implementations, the layer of material providing the tennis ball with a high friction, soft texture may comprise fibers of material directly bonded to the spherical core, fused to the spherical core or molded onto the spherical core.

Disclosed are example tennis balls that include a spherical core comprising an outer surface and a raised wall integrally molded as part of the outer surface. In one implementation, the raised wall and the spherical core are formed from the same material, formed in a single molding process. In another implementation, the raised wall and the spherical core are formed from different materials, wherein the raised wall is molded over and about the spherical core. For example, in one implementation, material of the raised wall may have a lower melting point as compared to the material of the spherical core, facilitating melting of the raised wall without correspondingly melting or substantially degrading the spherical core.

In some implementations, the raised wall forms cavities, depressions or recesses which extend between a layer of material that provides the tennis ball with a higher friction texture. In one implementation, the raised wall simulates a seam, the raised wall extending along a line having the shape, or corresponding to the shape, of a dog bone shape or a stadium shape. In such implementations, the above-described panels providing a high textured surface may be inset within the depressions or cavities between the raised wall. In implementations that do not provide the high textured surfaces using panels, the textile or fibrous material may be directly joined to the spherical core within the depressions or cavities between the raised wall.

In implementations comprising the raised wall, may be heated during manufacturing to cause portions of the raised wall to melt or flow so as to further join the portion or portions of the raised wall to the adjacent panels of textile or fibrous material. For example, upper portion of the raised wall may be melted so as to form an overhang above edges of the adjacent panels. In some implementations, portions of the raised wall may be melted so as to flow within or between, or impregnate, the fibers of the textile or fibrous material. The overhang and/or impregnation may provide enhanced securement of the panels to the spherical core. In some implementations, the edges of the panels of the textile or fibrous material may comprise a layer of thermoplastic material that can be melted and fused to the opposing sides of the raised wall. In some implementations, the fibrous material may be subsequently fluffed so as to cause portions of the fibrous material to rise above the top of the raised wall.

In some implementations, the top surfaces of the raised wall may themselves be textured to enhance the ability of a tennis player to impart spin to the tennis ball. For example, in some implementations, the top surface of the wall may be provided with dimples. In some implementations, the top surface of wall may provided with gripping protrusions or fingers. In yet other implementations, the top surface or top portions of the wall may be provided with grooves or serrations. Such gripping structures may be formed during the melting of the top portions of the raised wall described above.

Disclosed are example tennis balls comprising a non-foamed hollow thermoplastic core formed by two half shells. The two half shells comprise a layer of thermoplastic material along the edges, wherein the thermoplastic material along the edges is melted to fuse the edges of the two half shells to form the spherical core. In one implementation, a hotplate is used to heat the edges to a temperature above the melting point of the thermoplastic material, wherein the molten thermoplastic material of the two edges are brought into fusing contact to join the two half shells. In another implementation, the edges of the two half shells may be fused through spin welding. In still other implementations, the edges of the two halves of may be heated, melted and fused in other fashions. Because the two half shells are joined through the fusing of the melted thermoplastic material along the edges, the juncture between the two half shells can exhibit reduced gas permeability, prolonging the useful life of the tennis ball, when pressurized.

In some implementations, the tennis ball formed by the two half shells may be pressurized. In some implementations, the tennis ball formed from the two half shells may be pressurized by the insertion of a pressurization material between the two half shells prior to their joining. The pressurization material is inserted while in a solid or liquid state. The pressurization material is configured to experience a phase change to a gaseous state after the joining, pressurizing the interior of the spherical core to a desired or predetermine pressure level or range. The phase change may be the result of a chemical reaction or temperature changes. For example, in one implementation, the pressurization material may be a solid mass of pressurization material that changes to a gaseous state or phase.

In one implementation, the pressurization material may be a solid mass of dry ice (solid $CO_2$). The mass slowly transitions to a gas state, pressurizing the interior of the spherical core. Because the two half shells are joined through the local application of heat to the edges of the half shells being joined, the transition of the solid mass of dry ice to a gaseous phase is sufficiently slow such that the generation of the gas from the mass of dry ice largely occurs after the two half shells have been joined to one another. The localized heating facilitates practical and economical joining of the two half shells in a sufficiently short period of time and in a sufficiently localized manner such that the mass of dry ice does not rapidly change state to a gas in such a short period of time so as to allow the escape of the gas before the two half shells have been joined to one another. As a result, a majority of the generated gas is captured between the joint half shells to pressurize the hollow interior of spherical core. The volume or mass of the dry ice inserted a position between the half shells prior to the joining may vary depending upon temperature conditions, the localization of the heat applied to the edges and the extent to which the spherical core is to be pressurized. The use of the pressurization material to pressurize the spherical core reduces the complexity and cost that would otherwise be associated with pressurization of the tennis balls. The use of the pressurization material also prevents the introduction of other punctures, holes, seams or other openings that would other be required to pressurized the core of a pressurized tennis ball.

FIG. 1 is a sectional view of portions of an example tennis ball 20. FIG. 1 is a sectional view of a spherical core 30 of the example tennis ball 20. Core 30 provides tennis ball 20 with performance characteristics similar to regulation tennis balls under ITF and USTA specifications. The core 30 is hollow and defines an internal volume 32. Core 30 comprises a thermoplastic material having a specific gravity of 0.86 to 1.38, a flexural modulus of 2.0 to 50.0 MPa, and a Shore D hardness of 10 to 70. The core has a thickness of the thermoplastic material of between 3.0 and 8.0 mm, the thickness of the thermoplastic material configured to maintain dimensional stability at internal pressures of between zero and 15 psi. In one such implementation, the disclosed tennis balls conform to ITF and USTA size, weight, deformation and rebound requirements. In particular, the disclosed tennis balls satisfy the following requirements:

Size (or diameter): 2.57 inches-2.70 inches (65.4-68.6 mm)
Weight: 56.0 g-59.4 g
Deformation: 0.220 inch-0.290 inch
Rebound: 54.0 inches-60.0 inches In one implementation, the material of the thermoplastic core of the example tennis balls comprise a non-foamed thermoplastic material. The thermoplastic material may comprise a blend of one or more of the following materials: polyethylene, ethylene-alkene copolymers, ethylene-carboxylic acid copolymers, ethylene-carboxylic acid-alkyl acrylate terpolymers, metal ion-neutralized ethylene-carboxylic acid copolymers or terpolymers, nylon, polyester, or other thermoplastic materials. The thermoplastic material can be translucent, transparent or clear, can be a natural color, or can be pigmented with color concentrate to achieve a desired cosmetic appearance.

Core 30 has a size, weight, deformation and rebound performance within the specifications of a standard or regulation tennis ball core, but with a lower material specific gravity (the ratio of the density of the solid part of a material to the density of water at 20° C.). In particular, core 30 may have a material specific gravity of 0.862 and 1.38 as compared to existing regulation rubber tennis balls, such as a Wilson® U.S. Open tennis ball or a Wilson® Championship ball, which generally have a material specific gravity of 1.25 to 1.3. Due to the lower specific gravity, the shell of core 30 may be thicker. Some implementations, the shell of core 30 (the circumferential wall of core 30) has a thickness of between 3 mm and 8 mm. The increased thickness of core 30 increases the stability of tennis ball 20 upon impact and assists in maintaining dimensional stability of core 30 at different levels of internal pressure. The increased thickness can also assist with pressure retention of the tennis ball.

In one implementation, as shown in FIG. 1, core 30 comprises a single continuous hollow sphere formed by such methods as roto-molding or blow molding. In another implementation, core 30 may be formed from multiple core sections, which are fused, welded, bonded or otherwise joined to one another to form the complete core shown in 1. For example, as will be described hereafter, in some implementations, core 30 may be formed from two hollow hemispheres which are joined at their meeting edges.

In one implementation, core 30 is formed from a non-foamed composition comprising one or more ethylene-alkene copolymers. Materials suitable for use in thermoplastic tennis balls cores are available under the tradename Engage and Infuse (manufactured by the Dow Chemical Company), and under the tradename Exact (manufactured by ExxonMobil Chemical). In a preferred embodiment, the tennis ball core of the invention should have material specific gravity of 0.862 to 0.900 and a thickness of between about 5.0 mm and 7.0 mm.

In a specific embodiment, the non-foamed thermoplastic tennis ball core comprises a blend of Engage 7270 (a copolymer of ethylene and butene) and Engage 7467 (a copolymer of ethylene and butene). In a further embodiment, the non-foamed thermoplastic tennis ball core comprises a blend of Engage 7467 (a copolymer of ethylene and butene) and Infuse 9507 (a block copolymer of ethylene and octene). In a specific embodiment, the tennis ball core of the invention should have a core diameter of between 2.41 and 2.45 inches, a weight of between 43.5 and 45.0 grams, a material specific gravity of between 0.862 and 0.880, and a core thickness of between about 5 mm and 7 mm.

TABLE 1

Material Properties

| Material | Specific Gravity | Hardness Shore D | Flexural Modulus (MPa) | Tensile Strength (MPa) |
|---|---|---|---|---|
| Engage 7270 | 0.880 | 26 | 22.1 | 13.9 |
| Engage 7467 | 0.862 | 12 | 4.0 | 2.0 |
| Infuse 9507 | 0.866 | 15 | 13.9 | 5.3 |

The core 30 may be produced by injection molding half-shells in a mold and de-molding the half-shells. Two of the half-shells are then joined together by hot plate welding or spin welding. The cores can be made either without pressure (hot plate welding with no internal pressure) or can be pressurized by placing dry ice (frozen carbon dioxide) into one half-shell prior to the half-shells being joined together. The pressure can be controlled based upon the amount of dry ice placed into the half-shell and calculating the amount of gaseous carbon dioxide that will be present in the molded core after the evaporation, or sublimation, of the dry ice.

The core of one example embodiment may have a core diameter of between 2.41 and 2.45 inches, and a weight of between 43.5 and 45.0 grams.

Core 30 may be covered with felt through the application of an adhesive that will adhere to both the felt and the thermoplastic core. Methods of adhering the felt to the core can include, but are not limited to, one or more of the following: Applying a tape-type adhesive to the felt, applying a spray adhesive to the core, applying a hot melt adhesive to the felt and/or the core, infusing the felt with a polymeric scrim backing and in all examples compressing the felt covering to the thermoplastic core. If core 30 is provided with a smooth surface, either the felt panels need to have sufficient adhesive applied to the core and the felt panels such that the adhesive spreads upon felt application to create a visible seam between the felt, or felt panels. In another implementation, the felt panels can be applied to the surface such that there is no visible seam line after adhering the panels to the core. In yet other implementations, other coverings, such as polyester, nylon "flocking" or other forms of synthetic or natural fiber or fabric coverings may be utilized.

Figure 2:
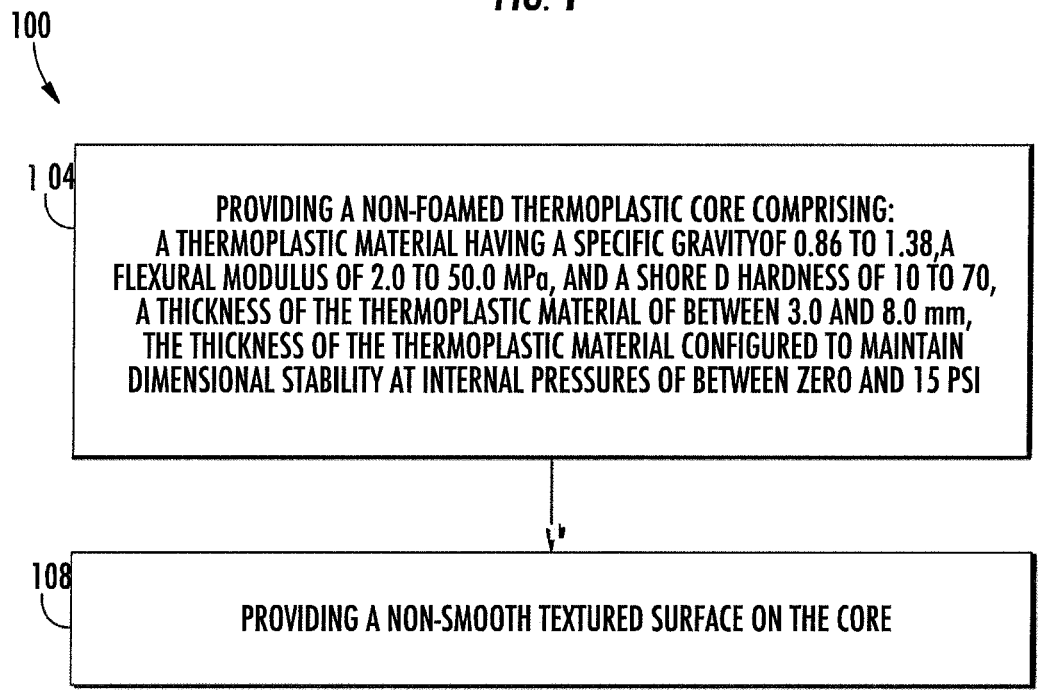
FIG. 2 is a flow diagram of an example method for forming an example tennis ball.

FIG. 2 is a flow diagram of an example method 100 for forming an example tennis ball. As indicated by block 104, a non-foamed thermoplastic core is provided. The core a specific gravity of 0.86 to 1.38, a flexural modulus of 2.0 to 50.0 MPa, and a Shore D hardness of 10 to 70. The core has a thickness of the thermoplastic material of between 3.0 and 8.0 mm, the thickness of the thermoplastic material configured to maintain dimensional stability at internal pressures of between zero and 15 psi. In particular, the core can have the following properties:

Size: 2.360-2.450 inches (60.0-62.2 mm)
Weight: 43.5 g-45.0 g
Deformation: 0.240-0.280 inches
Rebound: 67.0-71.0 inches.

In one such implementation, the disclosed tennis balls conform to ITF and USTA size, weight, deformation and rebound requirements. In particular, the disclosed tennis balls satisfy the following requirements:

Size: 2.57 inches-2.70 inches (65.4-68.6 mm)
Weight: 56.0 g-59.4 g
Deformation: 0.220 inch-0.290 inch
Rebound: 54.0 inches-60.0 inches As indicated by block 108, a non-smooth textured surface is provided on the core. In one implementation, at least one panel is secured to the exterior of the core. The at least one panel provides a non-smooth textured high friction surface. In one implementation, the at least one panel comprises a textile, fabric or fibrous layer supported by a scrim backing. In one implementation, scrim backing may have a thermoplastic surface that may be melted to infuse to the thermoplastic surface of the core. In some implementations, the edges of the panels may be provided with a thermoset material or a thermoplastic material which secures adjacent panels to one another and which forms seams between adjacent panels. In other implementations, the scrim backing may be adhesively bonded to the core. In yet other implementations, fabric of fibers may be directly adhered, fused or melted to the outer surface of the core.

Figure 3:
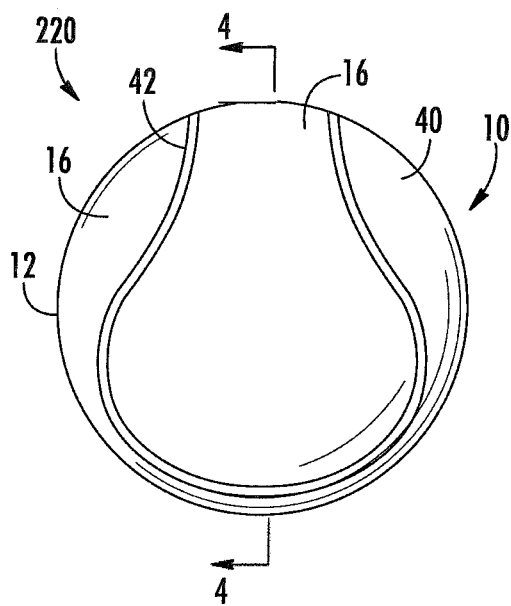
FIG. 3 is a front view of an example tennis ball.
Figure 4:
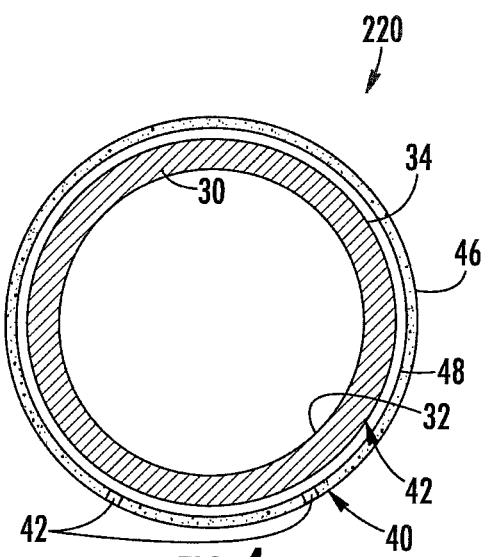
FIG. 4 is a sectional view of the example tennis ball of FIG. 3 taken along line 4-4.
Figure 5:
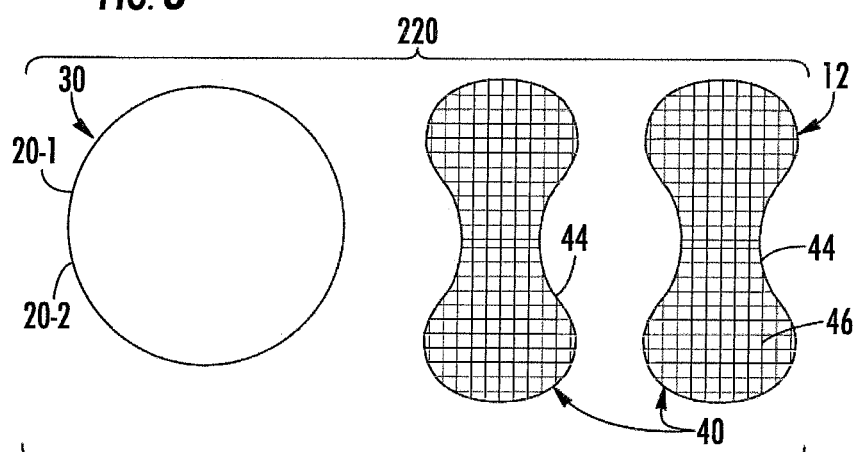
FIG. 5 is an exploded view of the tennis ball of FIG. 3.

FIGS. 3-5 illustrate an example tennis ball 220. Tennis ball 220 comprises core 30 and panels 40. Core 30 as described above with respect to FIG. 1. Core 30 has a hollow interior 32 and an outer smooth exterior surface 34 to which panels 40 are secured.

Panels 40 extend about an over surface 34 of core 30. Panels 40 provide tennis ball 220 with a textured, high friction surface that facilitates impartation of spin to the tennis ball 220 by a tennis racket (not shown). As shown by FIG. 5, panels 40 comprises two dog bone shaped panels. As shown by FIG. 3, the dog bone shaped panels nested mate with one another to substantially cover the entirety of surface 34 but for seam 42. In the example illustrated, the edges 44 of at least one of panels 40 are coated with a material that secures the edges of adjacent panels 40 and forms seam 42. In another implementation, the panels 40 can be stadium-shaped, such as the shape of panels 440 of FIG. 7.

In one implementation, the edges 44 of at least one of panels 40 are provided with a coating of thermoset material or adhesive material. The panels 40 are secured over core 30 prior to the solidification or curing of the thermoset material or adhesive material. Upon curing, the coating joins the edges 44 of adjacent panels 40 to one another and forms the seam 42.

In another implementation, the edges 44 of at least one of panels 40 are provided with a thermoplastic material. For example, one implementation, the edges 44 of at least one of the panels 40 may have an outer edge layer formed from the same thermoplastic material as that of the outer surface of core 30. In such an implementation, the edges may be positioned adjacent to one another while the thermoplastic material is in a solid state, wherein the thermoplastic material may be subsequently heated and melted to facilitate fusing of the edges of the two adjacent panels and to forms seam 42. In yet other implementations, the panels 40 may be positioned about core 30 while the thermoplastic material along the edges of panels 40 is in a liquid or molten state, wherein solidification of the thermoplastic material joins the adjacent panels 40 and forms seam 42. In yet other implementations, the panels 40 may positioned about core 30 with a empty spacing between panels 40, wherein the thermoplastic and/or adhesive material forming the exterior surface of core 30 is heated to a temperature above its melting point, and receives externally applied radial pressure, causing portions of the thermoplastic and/or adhesive material to flow into and between panels 40, securing panels 40 in place and forming seam 42.

As shown by FIG. 4, in the example illustrated, each of panels 40 comprises an outer textured layer 46 supported by a backing 48. The outer textured layer 46 may comprise a felt cover. In some implementation, the felt cover may comprise a woven fiber material. In other implementations, felt cover may comprise a needle-punched, non-woven fiber material. In still other implementations, layer 46 may comprise a non-felt material.

Backing 48 can be sandwiched or positioned between layer 46 and the outer surface 34 of core 30. In the example illustrated, backing 48 comprises at least one layer of a thermoplastic material. In one implementation, the thermoplastic material of backing 48 which contacts surface 34 comprises the same thermoplastic material that is used to form the surface 34 of core 30. In one implementation, the thermoplastic material of backing 48 is melted and fused to surface 34 of core 30. In one implementation, thermoplastic material backing 48 is melted and fused to the also melted surface 34 of core 30, wherein both of the materials along the interface are melted and mixed to form a continuous bond, further lowering the air permeability of core 30.

In yet other implementations, backing 48 may be formed from a thermoplastic material, a thermoset material or other materials, wherein an additional layer of adhesive can be applied between backing 48 and surface 34 to secure panels 40 to core 30. In still other implementations, the layer of material providing the tennis ball with a high friction texture may comprise fibers of material directly bonded to the outer surface 34 of spherical core, fused to the outer surface 34 of spherical core or molded onto the outer surface 34 of spherical core, without any such backing.

Figure 6:
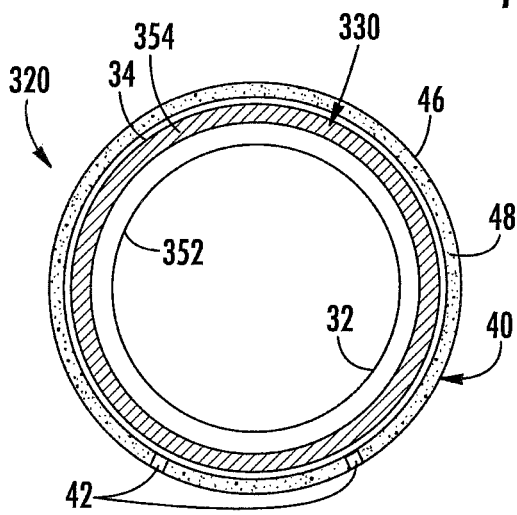
FIG. 6 is a sectional view of another example tennis ball.

FIG. 6 is a sectional view of an example tennis ball 320. Tennis ball 320 is similar to tennis ball 220 described above except that tennis ball 320 comprises core 330 in place of core 30. Those remaining components or elements of tennis ball 320 which correspond to components or elements of tennis ball 220 are numbered similarly.

Core 330 is similar to core 30 described above except that core 330 is composed of multiple layers. Core 330 comprises inner layer 352 and outer layer 354. Inner layer 352 extends about and adjacent to the hollow interior 32 of core 330. Inner layer 352 is formed from a first material. In one implementation, inner layer 352 is formed from a thermoset material. In another implementation, inner layer 352 is formed from a thermoplastic material having a first melting point. Inner layer 352 provides the structural integrity of the hollow spherical core 330.

Outer layer 354 comprises at least one layer of thermoplastic material encapsulating and extending about inner layer 352. In the example illustrated, outer layer 354 serves as an interface between inner layer 352 and backing 48 of panels 40. Outer layer 354 may be molded about inner layer 352. In implementations where inner layer 352 is also formed from a thermoplastic material, inner layer 352 and outer layer 354 may be co-molded.

In implementations where the inner layer 352 is also formed from a thermoplastic material, the thermoplastic material of outer layer 354 can have a second melting point that is lower than the first melting point of inner layer 352. The first melting point of inner layer 352 may also be higher than the melting point of the thermoplastic material of backing 48. During fabrication, backing 48 and outer layer 354 may be heated to a temperature that is at or above their respective melting points while being below the melting point of inner layer 352. As a result, backing 48 may be fused to outer layer 354 upon solidification of the molten material or materials without melting or with reduced melting of inner layer 352 to maintain or preserve the structural integrity of inner layer 352 and that of core 330.

In one implementation, inner layer 352 may be formed from a first thermoplastic material while outer layer 354 can be formed from a second different thermoplastic material. Backing 48 may be formed from thermoplastic material having a melting point less than, equal to or greater than the melting point of outer layer 354, but lower than the melting point of inner layer 352.

Figure 7:
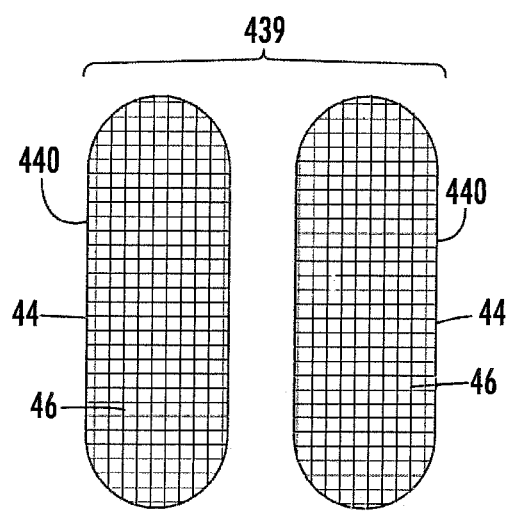
FIG. 7 is a plan view illustrating a set of cover panels for an example tennis ball.

FIG. 7 illustrates a set 439 of panels 440 that may be utilized in place of panels 40 in each of the implementations described in this disclosure. Panels 440 are similar to panels 40 described above except that panels 440 are stadium-shaped rather than dog-bone shaped. As with panels 40, panels 440 are sized so as to substantially cover the spherical core when wrapped about the spherical core, but for seam 42 (shown in FIG. 3). As will be described hereafter, seam 42 may be natural or may be simulated with a raised wall.

Figure 8:
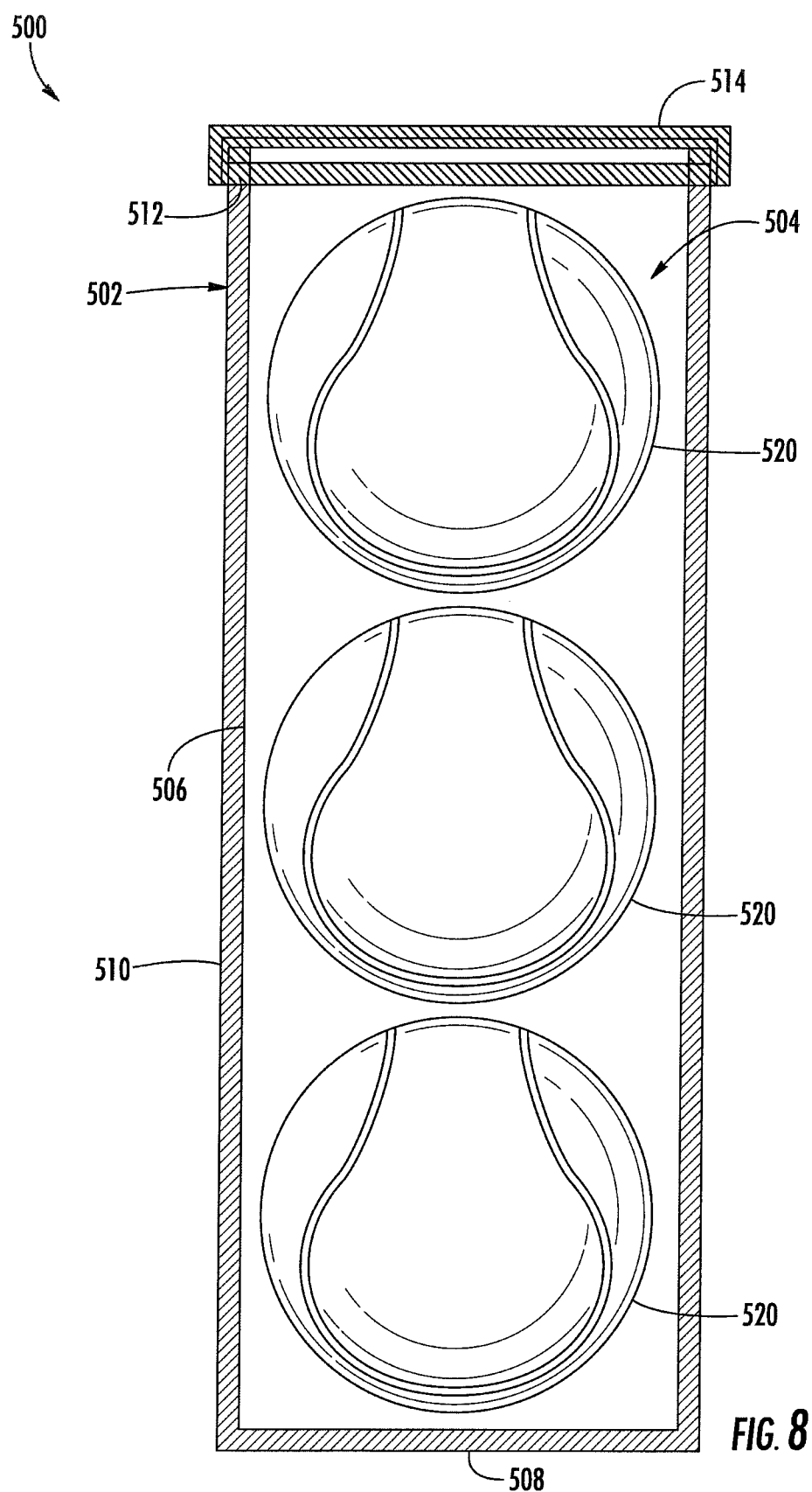
FIG. 8 is a side view of an example tennis ball package was portions of an example container shown in section.
Figure 13:
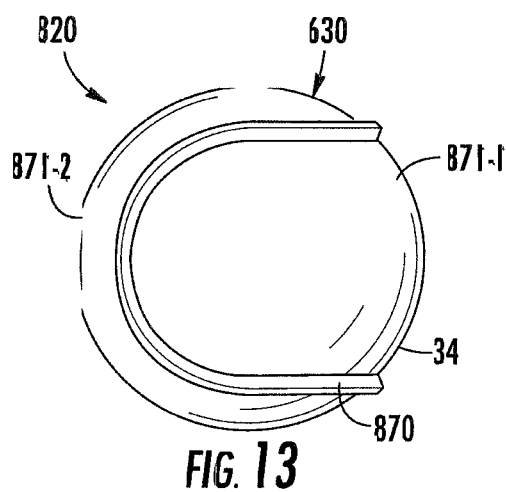
FIG. 13 is a first front view of an example thermoplastic core and raised wall of an example tennis ball.
Figure 14:
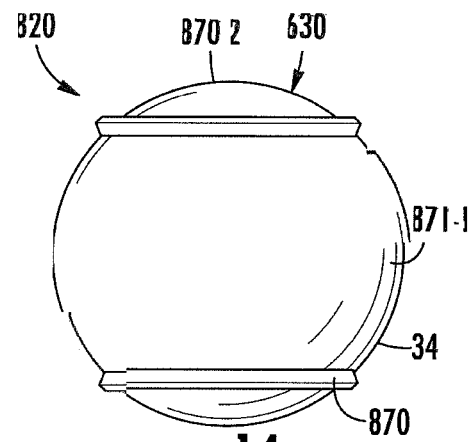
FIG. 14 is a right side view of the thermoplastic core and raised wall of FIG. 13.
Figure 15:
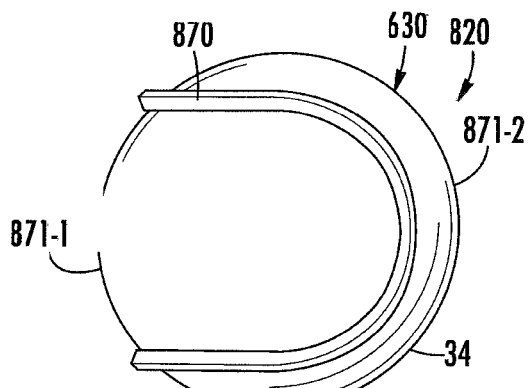
FIG. 15 is a rear view of the example thermoplastic core and raised wall of FIG. 13.
Figure 16:
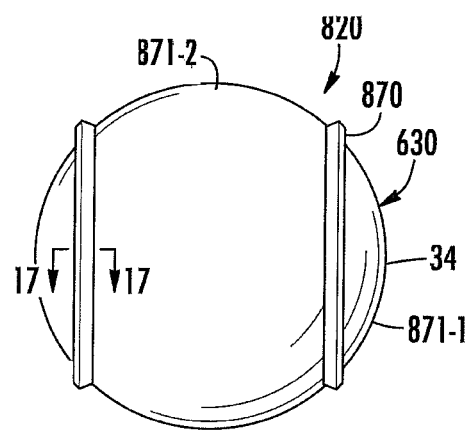
FIG. 16 is a left side view of the example thermoplastic core and raised wall of FIG. 13.

FIG. 8 is a sectional view of an example tennis ball package 500. Package 500 comprise a sealed container 502 and a set of tennis balls 520 (described above). Although package 500 is illustrated as comprising three of such tennis balls 520, in other implementations, package 500 may comprise two tennis balls or greater than three tennis balls 520.

Tennis balls 520 may each be similar to tennis ball to 20 or tennis ball 320 described above, wherein the respective cores 30 and 330 are not pressurized or are pressureless.

Sealed container 502 comprises a cylindrical can containing tennis balls 10. In one implementation, Sealed container 502 has an interior 504 containing tennis balls 520 and sealed so as to have an internal pressure of no greater than 10 psi. In one implementation, container 502 is sealed so as to have an internal pressure of no greater than eight psi. In other implementations, container 502 is sealed so as to have an internal pressure less than that of the internal pressure of the individual tennis balls 10. In one implementation, container 502 is sealed so as to have an internal pressure equal to atmospheric pressure, the pressure of the ambient environment. In such an implementation, the sealing of container 502 does not maintain the internal pressure of container 502, but merely indicates that such package 500 has not been tampered with or used, being in a "fresh" state.

In the example illustrated, container 502 comprises a cylindrical body 506 having a floor 508 and cylindrical sidewalls 510. The top of body 506 is provided with a top seal 512 and a removable cap or cover 514. The top seal 512 seals the interior 504. In one implementation, the top seal 512 comprises a metallic panel, a portion of which may be scored to facilitate peeling away of portions of the top seal to gain access to the interior 504 and facilitate removal of balls 10. The removable cover 514 resiliently snaps about or pops onto the top of body 106, over the top seal 112. Top seal 112 assist in retaining balls 10 within interior 504 during subsequent use, after top seal 112 has been broken or removed.

As discussed above, the performance longevity of tennis balls 520 allow tennis balls 520 to be packaged in a lower pressure container. In some implementations, the container containing tennis ball 520 may be at atmospheric pressure, eliminating the need to pressurize container 502 during the packaging of tennis balls 520. The lower pressure container 502 reduces the complexity and cost of packaging tennis balls 520. In implementations where container 502 is not pressurized, but is at atmospheric pressure, top seal 512 may be omitted. In such implementations, tennis balls 520 may undergo post manufacturing operations at remote sites over space time intervals without such tennis balls having to be initially packaged in a pressurized container and then repackaged again in a pressurized container following such post manufacturing operations. One example such post manufacturing operations is the application of logos to the exterior of such tennis balls.

Although container 502 is illustrated as a cylindrical can having a metallic ceiling panel and a removable top cap or cover, in other implementations, container 502 may have other configurations and shapes. The ability of tennis balls 520 to have performance longevity at low pressure conditions or at atmospheric pressure facilitates the use of a wide range of containers. For example, in some implementations, container 502 may comprise an air permeable package or an air permeable net, wherein sealing mechanisms simply indicate that the sold package has not been tampered with or previously opened, ensuring no prior use of the tennis balls at a point of sale.

In yet another implementation, tennis balls 520 are pressurized, the respective cores 30, 330 are pressurized above atmospheric pressure. In one implementation, tennis balls 520 are pressurized to a pressure from 10 psi to no greater than 15 psi, providing tournament play performance immediately upon removal from container 502 without any modification of balls 520, without requiring inflation through a valve or other mechanism not provided on any of balls 520. In such an implementation, the interior 504 may be pressurized to a pressure above atmospheric pressure in some implementations to a pressure greater than 10 psi to prolong the life of tennis balls 520 (reduce pressure drops within balls 520) until removed from container 5024 use.

FIG. 9 illustrates an example method for pressurizing a tennis ball core. FIG. 9 illustrates the assembly and pressurization of spherical core 630. Spherical core 630 is similar to core 30 except that spherical core 630 is specifically illustrated as being formed from two similar opposing half shells 631-1 and 631-2 (collectively referred to as shells 631). Half shells 631 are each formed from a thermoplastic material such as any of the thermoplastic materials described above for the formation of core 30. Each of half shells 631 comprises an inner edge 633 (or the sealing or seam edge).

To form spherical core 630, at least one of edges 633 is heated to a temperature above the melting point of the thermoplastic material along edges 633, whereupon the edges 633 are brought into mating contact with one another such that edges 633 fuse together. In one implementation, at least one of edges 633, and nominally both of edges 633, are initially brought into contact with or in proximity with a heated plate which applies local heat to one or both of edges 633. In another implementation, the edges 633 of the two half shells 631 may be fused through spin welding. In still other implementations, the edges of the two half shells 631 of may be heated, melted and fused in other localized heating fashions. The localization of the applied heat reduces energy consumption cost and reduces the possibility that other portions of the half shells 631, distant edges 633 will be excessively heated to a point of impairing their structural integrity.

In one implementation, one of edges 633 is heated to a temperature so as to melt the thermoplastic material of that edge, wherein the edge 633 of the other of shells 631 melts upon contacting the heated edge 633. In another implementation, both of edges 633 are concurrently heated, melted and brought into contact with one another. In yet another implementation a first one of edges 633 is heated to a temperature at or above the melting point of the thermoplastic material and a second one of edges 633 is heated to an elevated temperature, but below the melting point of thermoplastic material, wherein the melted portion of the first edge 633 apply sufficient heat to the second edge when brought into contact with the second edge so as to melt the second edge, facilitating fusing of the first edge and the second edge.

Such fusing of the edges 633 provide a more homogenous, continuous and solid juncture between shells 631. As a result, the juncture is more impermeable, providing a lower rate of diffusion and delaying depressurization of core 630. Although core 630 can be pressurized as described herein, in other implementations, core 630 may not be pressurized such as when core 630 is used as part of a pressureless tennis ball.

As further shown by FIG. 9, prior to the joining of shells 631, a pressurization material (PM) 660 can be deposited or otherwise positioned between the half shells 631 so as to be contained and captured within half shells 631 following their joining. The pressurization material 660 is inserted while in a solid or liquid state. The pressurization material 660 is configured to experience a phase change to a gaseous state after the joining, thereby pressurizing the interior of the spherical core 630. The phase change may be the result of a chemical reaction or temperature changes. For example, in one implementation, the pressurization material 660 may be a solid mass of pressurization material that changes to a gaseous state or phase.

In one implementation, the pressurization material 660 may be a solid mass of dry ice (solid $CO2$). The mass slowly transitions to a gas state, pressurizing the interior of the spherical core. Because the two half shells 631 are joined through the local application of heat to the edges of the half shells being joined, the transition of the solid mass of dry ice to a gaseous phase is sufficiently slow such that the generation of the gas from the mass of dry ice largely occurs after the two half shells 631 have been joined to one another. The localized heating facilitates practical and economical joining of the two half shells 631 in a sufficiently short period of time and in a sufficiently localized manner such that the mass of dry ice does not rapidly change state to a gas in such a short period of time so as to allow the escape of the gas before the two half shells 631 have been joined to one another. As a result, a majority of the generated gas is captured between the joint half shells 631 to pressurize the hollow interior of spherical core 630. The volume or mass of the dry ice inserted a position between the half shells 631 prior to the joining may vary depending upon temperature conditions, the localization of the heat applied to the edges and the extent to which the spherical core is to be pressurized. The use of the pressurization material 660 to pressurize the spherical core reduces the complexity and cost that would otherwise be associated with pressurization of the tennis balls.

The resulting core 630 comprises a non-foamed thermoplastic core lacking valves or other inflation passages. The resulting core 630 may have an internal pressure, resulting at least in part from the pressurization material 660, greater than atmospheric pressure and up to 15 psi. In one implementation, the resulting core 630 may have an internal pressure of at least 10 psi and no greater than 15 psi.

In one implementation, the resulting core 630 has a density of 0.86 to 1.38, a flexural modulus of 2.0 to 50.0 MPa, and a Shore D hardness of 10 to 70. The core 630 can have a thickness of the thermoplastic material of between 3.0 and 8.0 mm, the thickness of the thermoplastic material configured to maintain dimensional stability at internal pressures of between zero and 15 psi. The core 630 can also have a diameter within the range of 2.360 to 2.450 inches, a weight of 43 to 46 grams, a deformation of from 0.200 to 0.300 inch, and a rebound of 65 to 72 inches. In another implementation, the core can have a size within the range of 2.360 to 2.45 inches, a weight within the range of 43.5 to 45 grams, a deformation of 0.240 to 0.280 inch and rebound of 67 to 71 inches.

FIGS. 10 and 11 illustrate an example tennis ball 620 formed from core 630. FIG. 11 illustrates the fusion of half shells 631 along junction 635 and the subsequent pressurization of core 630 as a result of the pressurization material 660 changing to a gaseous phase or state. The resulting gas pressurized core 630 of tennis ball 620 has materials not found in naturally occurring air or has levels of materials or elements such as carbon dioxide and nitrogen that are substantially different from levels of the corresponding materials found in air. As described above, in one implementation where pressurization material 660 comprise dry ice, the gas pressurizing the interior 32 of tennis ball 620 comprises carbon dioxide at percentages or levels much larger than found in air. In one implementation, the interior 32 of tennis ball 620 is pressurized with carbon dioxide to an internal pressure of about 4 to 14 psi, and nominally to a pressure of about 7 to 11 psi. In one example, a small amount of dry ice can be positioned within the half shells 631 to produce a pressurized core, when the half shells 631 are joined, having an internal pressure of within the range of about 4 to 14 psi.

In yet other implementations, the interior of core 630 of tennis ball 620 may be pressurized in other fashions without relying upon a cost increasing valve mechanism incorporated into tennis ball 620. For example, in other implementations, half shells 631 may be joined while in pressurized atmosphere or container. In still other implementations, the interior of core 630 of tennis ball 620 may not be pressurized (such as at atmospheric pressure) during its construction such as in circumstances where half shells 631 are joined in an atmosphere that is at atmospheric pressure.

FIGS. 10 and 11 further illustrate the application of panels 40 to the thus formed pressurized core 630. The application of panels 40 to core 630 may be similar to the application of panels 40 to core 30 as described above. As discussed above, in other implementations, panels 440 may be utilized in place of panels 40. Tennis ball 620 may conform to ITF and USTA size, weight, deformation and rebound requirements. In particular, tennis ball 620 may satisfy the following requirements:

Size: 2.670 2.57 inches-2.70 inches (65.4-68.6 mm)
Weight: 56.0 g-59.4 g
Deformation: 0.220 inch-0.290 inch
Rebound: 54.0 inches-60.0 inches
Size: 2.670 inches-2.70 inches (65.4-68.6 mm)
Weight: 56.0 g-59.4 g
Deformation: 0.220 inch-0.290 inch
Rebound: 54.0 inches-60.0 inches FIG. 12 is a sectional view illustrating portions of an example tennis ball 720. FIG. 12 is taken along line 11-11 of FIG. 10, which also illustrates the exterior of tennis ball 720. Tennis ball 720 is similar to tennis ball 620 described above and is generally formed in the same manner as tennis ball 620 described above. Tennis ball 720 is formed from two half shells 731-1 and 731-2 (collectively referred to as half shells 731) which may be joined to one another in a fashion similar to the joining of half shells 631 as described above. In one implementation, the two half shells 731 are fused to one another along juncture 735 to form the core 730. The resulting spherical core 730 is similar to core 330 described above but for core 730 being formed from half shells 731. As with core 330 described above, core 730 is covered with panels 40 (described above) which are secured to core 730 in a fashion similar to the securement of panels 40 to core 330 as described above.

In the example illustrated, tennis ball 720 is pressurized with pressurization material 660. In one implementation, the pressurization material 660 is provided through the positioning or insertion of a solid or liquid mass of pressurization material 660 between half shells 731 prior to their joining. As described above, the resulting gas pressurized core 730 of tennis ball 720 has materials not found in naturally occurring air or has levels of materials or elements such as carbon dioxide and nitrogen that are substantially different from levels of the corresponding materials found in air. As described above, in one implementation where pressurization material 660 comprise dry ice, the gas pressurizing the interior 32 of tennis ball 720 comprises carbon dioxide at percentages or levels much larger than found in air. In one implementation, the interior 32 of tennis ball 720 is pressurized with carbon dioxide to an internal pressure of about 4 to 14 psi, and nominally to a pressure of about 7 to 11 psi.

In yet other implementations, the interior of core 730 of tennis ball 720 may be pressurized in other fashions without relying upon a cost increasing valve mechanism incorporated into tennis ball 720. For example, in other implementations, half shells 731 may be joined while in pressurized atmosphere or container. In still other implementations, the interior of core 730 of tennis ball 720 may not be pressurized (such as at atmospheric pressure) during its construction such as in circumstances where half shells 731 are joined in an atmosphere that is at atmospheric pressure.

As with tennis ball 620, tennis ball 720 may conform to ITF and USTA size, weight, deformation and rebound requirements. In particular, tennis ball 720 may satisfy the following requirements:

Size: 2.670 2.57 inches-2.70 inches (65.4-68.6 mm)
Weight: 56.0 g-59.4 g
Deformation: 0.220 inch-0.290 inch
Rebound: 54.0 inches-60.0 inches FIGS. 13-17 illustrate portions of an example tennis ball 820. FIGS. 13-17 illustrate tennis ball 820 without any cover panels, such as panels 40, 440. Although not illustrated, it should be appreciated that cover panels, such as panels 440 described above, may be added to complete tennis ball 820. Tennis ball 820 is similar to tennis ball 620 described above except tennis ball 820 additionally comprises raised wall 870 joined to and extending over the exterior, otherwise smooth outer surface, of core 630.

Figure 17:
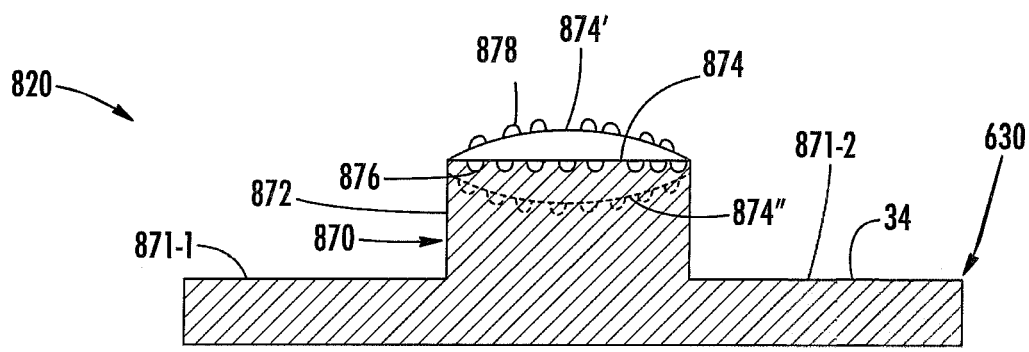
FIG. 17 is a sectional view of the thermoplastic core and raised wall of FIG. 16 taken along line 17-17.

Raised wall 870 comprises a raised rib or projection extending outwardly from the exterior surface of core 630. As shown by FIG. 17, raised wall 870 is integrally molded as part of the outer surface of core 630. Raised wall 870 is secured to the exterior of core 630 without any intervening adhesives. In one implementation, raised wall 870 and the outer surface of core 630 are formed during a single injection molding process wherein raised wall 870 is part of a single homogenous structure with the exterior surface of core 630. In such an implementation, both the exterior surface of core 630 and raised wall 870 are formed from the same thermoplastic material.

As shown by FIGS. 13-16, raised wall 870 extends along a continuous line that is in the shape of a stadium, matching in shape of the perimeter of stadium shaped panels 440 described above. Raised wall 870 forms a stadium-shaped recesses 871-1 and 871-2 (collectively referred to as recesses 871) which are oriented 90° from one another about core 630. As will be described hereafter, recesses 871 each receive a respective cover panel providing tennis ball 820 with a high friction textured surface configured for being impacted by the face of the tennis racket during play. Raised wall 870 extends between the cover panels, simulating a seam between the cover panels. In other implementations, raised wall 870 may alternatively extend along a dog-bone shaped line forming dog-bone shaped recesses, wherein the recesses are to receive panels 40 described above. In other implementations, the raised wall may form other shaped recesses. In still other implementations, the raised wall may be a plurality of wall segments arranged in a manner as to generally define a shape.

As shown by FIG. 17, raised wall 870 projects at an angle of 90° from the outer surface 34 of core 630. The angle of 90° facilitates separation from the mold as well as subsequent abutment with the applied cover panels. In other implementations, the sidewalls 872 of raised wall 870 may alternatively form an acute or obtuse angle with most adjacent portions of outer surface 34. As further shown by FIG. 17, the top 874 of raised wall 870 is generally flat, extending at an angle of 90° from sidewalls 872. In other implementations, the raised wall 870 may have a top 874' that is rounded or curved (as shown in broken lines) forming a convex surface as shown. In yet other implementations, the raised wall 870 may a top 874" that is rounded or curved (as shown in broken lines) forming a concave surface. In some implementations, any of the top surfaces 874, 874' or 874" may be provided with dimples 876 or pebbles 878 to enhance the gripability or frictional characteristics of the raised wall 870. In other implementations, top surfaces 874, 874' or 874" may be smooth. In one implementation, the raised wall 870 cab have a height that is above, or projects outward from, the outer surface 34 of the core 630 by at least 2.0 mm. In another implementation, the raised wall 870 cab have a height that is above, or projects outward from, the outer surface 34 of the core 630 by a dimension that is no greater than 4.0 mm. The height of the raised wall 870 is the dimension measured prior to the molding of the felt cover panels 40, 440 onto the surface of the thermoplastic core. In some implementations, the raised wall 870 can be molded/flowed into the felt during the application of the felt cover panel 440 to the outer surface 34 of the core 630 and after molding will be even with or recessed slightly from the edges of the felt to form a seam. In another implementation, the raised wall 870 has a width of at least 1.0 mm. In another implementation, the raised wall 870 has a width that is no greater than 2.5 mm. In other implementations, the raised wall can have other dimensions including other heights and other widths.

Figure 18:
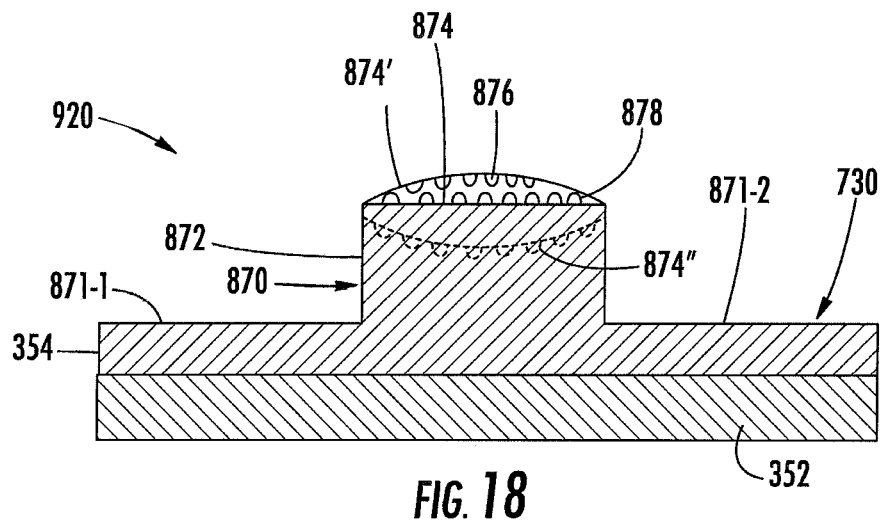
FIG. 18 is a sectional view of an example thermoplastic core and raised wall of an example tennis ball.

FIG. 18 is a sectional view illustrating portions of an example tennis ball 920. FIG. 18 illustrates tennis ball 920 without cover panels 40 shown in FIG. 10 or cover panels 440 shown in FIG. 7. Tennis ball 920 is similar to tennis ball 820 described above except that tennis ball 820 comprises core 730 in place of core 630. Those remaining components of tennis ball 920, which correspond to components of tennis ball 820, are numbered similarly and are shown in FIGS. 10 and 13-17. As should be appreciated, in some implementations, tennis ball 920 may have a raised wall 870 shaped for utilization with cover panels 40 in lieu of cover panels 440.

As described above, core 730 is formed from two core layers, core layers 352 and 354. In the example illustrated, raised layer 870 is integrally formed or integrally molded as part of core layer 354 formed of a thermoplastic material. In one implementation, the material forming core layer 354 and raised layer 870 is a lower melting point as compared to the melting point of the thermoplastic material forming core layer 352. As a result, portions of core layer 354 and raised wall 870 may be heated to a temperature so as to melt and fuse to portions of the cover panel 440 (or panel 40 when raised wall 870 is in a dog-bone shape) without or with lessened altering of the structural characteristics of inner core layer 352 and that of core 730.

Figure 19:
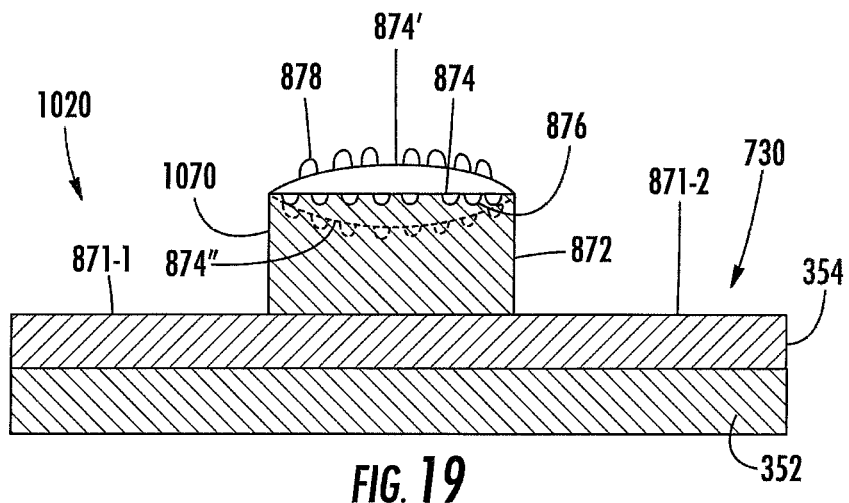
FIG. 19 is a sectional view of an example thermoplastic core and raised wall of an example tennis ball.

FIG. 19 is a sectional view illustrating portions of an example tennis ball 1020. FIG. 19 illustrates tennis ball 1020 without cover panels 440. Tennis ball 1020 is similar to tennis ball 920 described above except that tennis ball 1020 comprises raised wall 1070 in place of raised wall 870. Those remaining components of tennis ball 1020 which correspond to components of tennis ball 920 are numbered similarly and are shown in FIGS. 10 and 13-18. As should be appreciated, in some implementations, tennis ball 1020 may have a raised wall 1070 shaped for utilization with cover panels 40 in lieu of cover panels 440.

Raised wall 1070 is similar to raised wall 870 except that raised wall 1070 can be formed from a thermoplastic material different than that of at least the outer core layer 354. In one implementation, raised wall 1070 is formed from a thermoplastic material different than the thermoplastic material of outer core layer 354 as well as the thermoplastic material of inner core layer 352. In one implementation, raised wall 1070 is formed from a thermoplastic material that is softer than core layer 354. The softer nature of wall 1070 may facilitate tactile and performance characteristics closer to that of existing tennis balls where a thermoset adhesive applied to the edges of the cover panels forms the seam of the tennis ball. In one implementations, raised wall 1070 is formed from a thermoplastic material that has a lower melting point as compared to outer core layer 354. The lower melting point may result in raised wall 1070 melting more thoroughly or prior to the melting of outer core layer 354 to enhance fusion of outer wall 870 to the adjacent portions of the cover panels or enhanced encapsulation or locking of the adjacent portions of the cover panels (as will be described hereafter).

In one implementation, raised wall 1070 may be formed from a low melt thermoplastic material such as Engage 7457, whereas outer core layer 354 and/or the inner core layer 352 can be formed from a thermoplastic material such as a thermoplastic blend of Engage 7270 and Engage 7457. In other implementations, the raised wall 1070 may formed using a low melt temperature copolymer (such as an Engage copolymer) and the outer core layer 354 and/or the inner core layer 352 can be formed of Infuse higher melt temperature block copolymers. In other implementations, the raised wall 1070 can be formed of other low melt materials, and the outer core layer 354 and/or the inner core layer 352 can be formed other low melt materials or a higher melt material, and combinations thereof.

Referring to FIG. 18, in the example illustrated, raised wall 870 is integrally formed with layer 354. Raised wall 870 is secured to outer core layer 354 without intervening adhesives, fasteners of the like. In one implementation, raised wall 870 can be co-molded with layer 354, wherein raised wall 870 and outer layer 354 can be injection molded concurrently or in success of fashion. Referring to FIG. 19, in one implementation, raised wall 1070 can be co-molded with both core layers 352 and 354.

FIG. 20 and FIGS. 21A, 21B and 21C illustrate one example method for securing cover panels 440 to the core 630 and raised wall 870 for completing tennis ball 820. It should be appreciated that the described method may likewise be utilized for the securement of cover panels 440 to the core 630 and raised wall 870 of tennis ball 20. Moreover, it should be appreciated that the described method may likewise be utilized for the securement of cover panels 440 to the core 730 and raised wall 870 of tennis ball 920 or to the core 730 and raised wall 1070 of tennis ball 1020. Each of such implementations, the raised walls may be dog bone shaped to alternatively facilitate the use of cover panels 40 described above.

Figure 20:
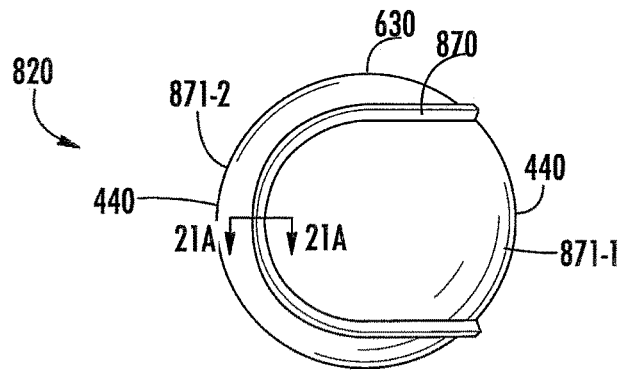
FIG. 20 is a front view of the thermoplastic core and raised wall of FIGS. 13-17 and the cover panels of FIG. 7 applied thereto.
Figure 21A:
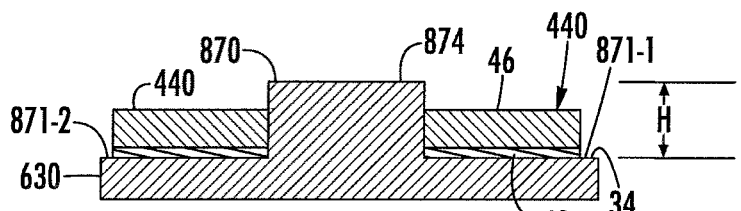
FIG. 21A is a sectional view of the core, raised wall and cover panels of FIG. 20 taken along line 21A-21A.

As shown by FIG. 20, panels 440 are positioned within recesses 871-1 and 871-2, on opposite sides of raised wall 870. As shown by FIG. 21A, raised wall 870 has a height H above surface 34 such that the top 874 rises above the top of panel 440. In the example illustrated, each of panels 440 may be simply resting upon surface 34 within the respective recesses 871-1, 871-2. In other implementations, panels 440 may be bonded to surface 34.

Figure 21C:
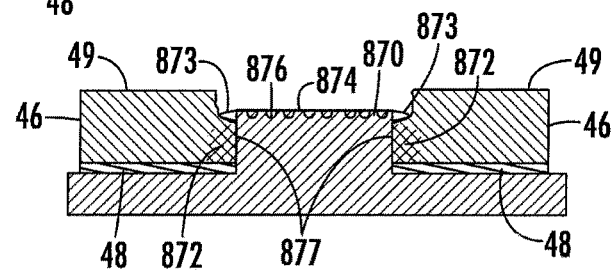
FIG. 21C is a sectional view illustrating the core, raised wall and cover panels of FIG. 21C following fluffing of the cover panels.
Figures 1, 21B:
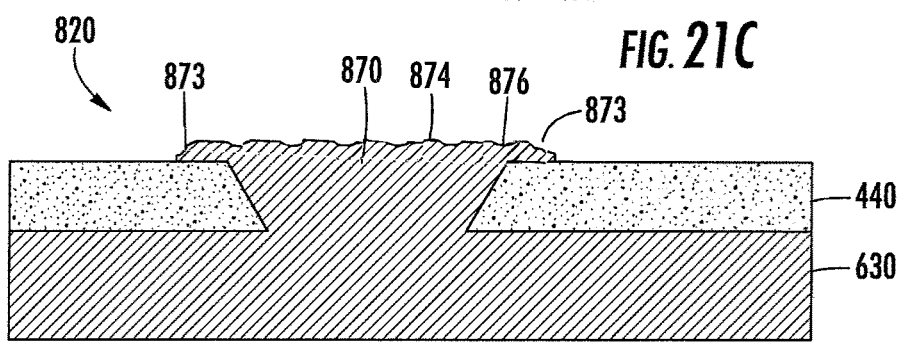
Figures 2, 21B:
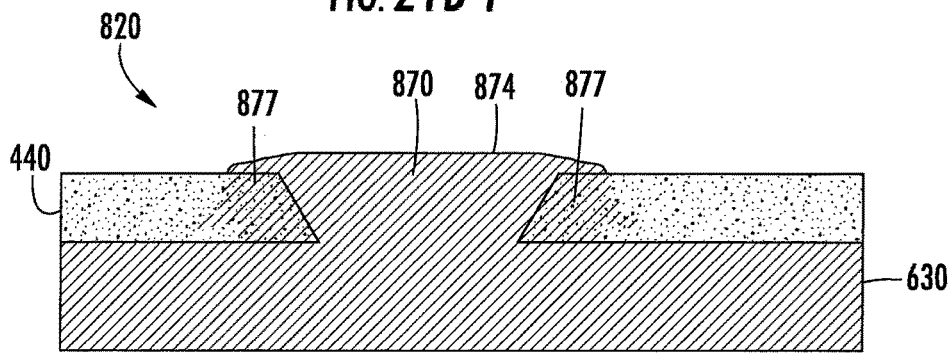

As shown by FIG. 21A and FIG. 21B-1, illustrate an implementation in which the application of heat to the ball 820 can cause the shape of the raised wall to change and to facilitate the engagement of the raised wall with the adjacent cover panels 440 and for formation of seams on the ball 820. FIG. 21B-1 illustrates heat can be applied to the outer surface of the ball 820. Upon application of such heat to the ball 820, the top surface 874 of the raised wall 870 begins to melt and the thermoplastic material forming the raised wall 870 can then flow over the adjacent regions or edges of the cover panels 440, such that once cured the thermoplastic material forming the raised wall 870 flattens out and widens to capture of extend over the edges of the cover panels 440 directly adjacent to the raised wall. In this implementation, ledges 875 can be formed over the adjacent edges of the cover panels 440.

In another implementation, as shown in FIG. 21B-2, the heat applied to the outer surface of the ball 820 can cause the raised wall 870 to begin to melt and flow into the adjacent regions of the cover panels 440 forming impregnated regions 877 where the thermoplastic material of the raised wall 870 has melt and flowed within the fibers of the cover panels 440. Once cured the thermoplastic material extends through out the edges of the cover panels 440 and between the fibers of the cover panels forming the impregnated regions 877.

In one implementation, the partially completed tennis ball of FIG. 21A may be placed in a spherical compression chamber which inwardly presses raised wall 870 and panels 440 against the core 630 as the heat is applied. In one implementation, the compression chamber may include internal surface structures, such as internal projections for forming dimples 876 or depressions for forming pebbles 878 in top 874 as top 874 is compressed and softened or melted. As described above, in other implementations, top 74 may be provided with other texturing which is molded during the compression and heating in the compression chamber.

As shown by FIG. 21C, layers 46 of panels 440 may be subsequently fluffed with combs. In the example illustrated, layers 46 are fluffed such that the tops 49 of panels 46 are elevated and project above top 874 of raised wall 870.

Figure 22:
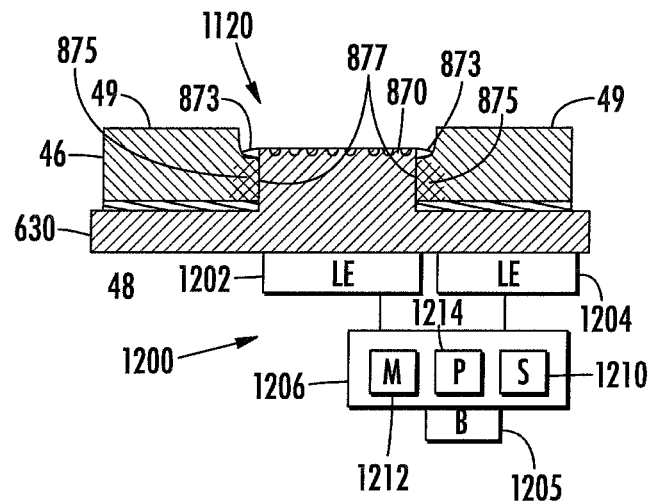
FIG. 22 is a sectional view illustrating portions of an example tennis ball.

FIG. 22 is a sectional view illustrating portions of tennis ball 1120. Tennis ball 1120 is similar to tennis ball 820 shown in FIG. 21C except that tennis ball 1120 additionally comprises illumination system 1200. Those remaining components of tennis ball 1120 which correspond to components of tennis ball 820 are numbered similarly. As shown by FIG. 22, illumination system 1200 comprises light emitters 1202, 1204, battery 1205 and illumination controller 1206.

In the example illustrated, the thermoplastic material forming at least one of core 630 and raised wall 870 is formed from a transparent or translucent thermoplastic material. Examples of such a transparent or translucent thermoplastic materials include, but are not limited to, an Engage copolymer, an Exact copolymer, polyethylene, ethylene-carboxylic acid copolymers, ethylene-carboxylic acid terpolymers, and metal ion-neutralized ethylene carboxylic acid copolymers or terpolymers. Light emitters 1202, 1204 are secured, such as through adhesive, two and interior surface of core 630. In one implementation, light emitters 1202, 1204 are bonded to the interior surface of the half shells prior to the joining of the half shells. In another implementation, light emitters 1202, 1204 are inserted into pockets or other retaining structures, molded on the interior surfaces of the half shells, prior to the joining of the half shells. In one implementation, the light emitters 1202, 1204 comprise light emitting diodes. In other implementations, light emitters 1202, 1204 may comprise other light-emitting structures such as electroluminescent wire or tape.

In the example illustrated, light emitters 1202 can be positioned opposite to raised wall 870 to transmit light through raised wall 870. Light emitter 1204 can be positioned opposite to at least one of panels 442 transmit light through panels 440. The illumination characteristics of light emitters 1202 and 1204 may be different. Such illumination may assist in enhancing focus, such as during practice session, or providing better visibility of the tennis ball at night or in lowlight conditions.

Battery 1205 comprises a source of electrical power for lighting is 1202, 1204 and controller 1206. In one up limitation, battery 1205 is bonded or secured to controller 1206 and/or the interior surface of core 630. In one implementation, battery 1205 may be secured within a pocket molded into core 630.

Illumination controller 1206 controls the output of light by light emitters 1202 and 1204. Illumination controller 1206 comprises a sensor 1210, memory 1212 and processor 1214. Sensor 1210 senses motion, responses or other conditions which may serve as a basis for turning light emitters 1202, 1204 on and off or for adjusting the lighting characteristics of light emitters 1202 and 1204. In one implementation, sensor 1210 may comprise a motion sensor, such as an accelerometer that senses movement or vibration of tennis ball 1120. In another implementation, sensor 1210 may comprise a light sensor, which senses lighting conditions. For example, environmental light may pass through portions of tennis ball 1120 and be sensed by sensor 1210, wherein signals from sensor 1210 may cause light emitters 1202, 1204 to be actuated or to emit light with particular characteristics depending upon the sensed ambient lighting condition.

Memory 1212 comprises a non-transitory computer-readable medium containing logic circuit elements, programming or other instructions that direct processor 1214 to output signals turning light emitters 1202, 2004 on or off or adjusting the non-zero lighting characteristics of light emitters 1202, 1204. In one implementation, instructions 1212 a direct processor 1214 to turn light emitters 1202, 1204 off in response to a lack of sensed motion or vibration from sensor 1210 in the form of an accelerometer, for a predetermined period of time. In such an implementation, instructions 1212 may direct processor 1214 to turn light emitters 1202, 1204 on in response to sensed motion from sensor 1210. In one implementation, instructions 1212 may direct processor 1214 to change the frequency, brightness or color of the light being emitted by light emitters 1202, 1204 based upon signals from sensor 1210, in the form an accelerometer, indicating a sensed spin, impact or speed of tennis ball 1120.

In some implementations, light emitted 1202, 1204 may emit different characteristic light based upon different sensed characteristics of ball 1120. In some implementations, instructions 1212 may direct processor 1214 to cause light emitters 1202, 1204 to emit different colors of light, to emit light of different blinking frequencies or to change the amplitude or brightness of the light based upon lighting conditions as sensed by sensor 1210.

Figure 23:
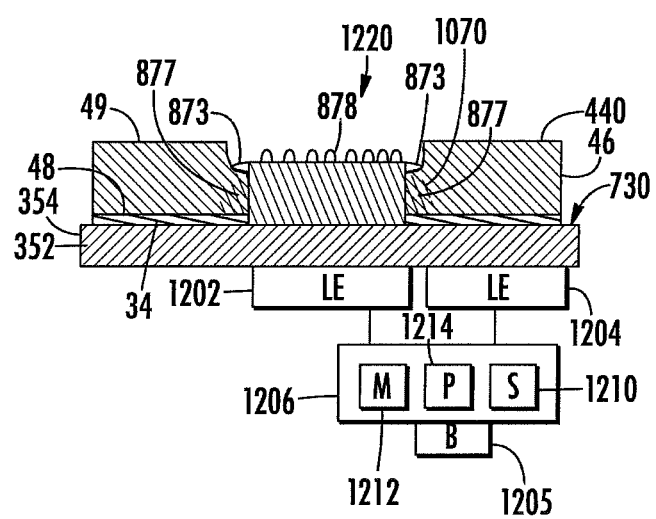
FIG. 23 is a sectional view illustrating portions of an example tennis ball.

FIG. 23 is a sectional view illustrating portions of an example tennis ball 1220. Tennis ball 1220 is similar to tennis ball 1120 except that tennis ball 1220 comprises core 730 in place of core 630 and comprises raised wall 1070 in place of raised wall 870. Tennis ball 1220 may be formed using the same process described above with respect to FIGS. 20 and 21A-21C. As described above, panels 840 are simply placed upon core 730 (similar to the step shown in FIG. 21A). In other implementations, panels 440 may be bonded to surface 34 of core 730. Thereafter, the assembly is placed within the compression chamber, wherein raised wall 1070 is heated and melted to form overhangs 873 and to at least partially impregnate the fiber or textile material of layer 46 of panels 440. In one implementation, layer 48 is additionally melted and fused to the melted portions of layer 354. Thereafter, as described above with respect to FIG. 21C, layer 46 of panels 440 is fluffed to the state shown.

In the example illustrated, raised wall 1070 is provided with pebbles 878. In one implementation, pebbles 878 are formed by the compression chamber that receives the partially completed tennis ball 1220 and which compresses panels 440 against core 730 while applying heat to soften or melt at least portions of wall 1070. In the example illustrated, each of layers 352, 354 and wall 1070 are formed from a transparent or translucent thermoplastic material to facilitate the transmission of light from light emitters 1202 and 1204. As described above, in one implementation, each of layers 352, 354 and wall 1070 may be formed from different thermoplastic materials having different melting points.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A tennis ball comprising:
    a non-foamed thermoplastic core defining an internal volume, the core being entirely formed from a composition or compositions omitting rubber, the composition comprising:
        a thermoplastic material having a specific gravity of 0.86 to 1.38, a flexural modulus of 2.0 to 50.0 MPa, and a Shore D hardness of 10 to 70,
        a thickness of the thermoplastic material of between 3.0 and 8.0 mm, the thickness of the thermoplastic material configured to maintain dimensional stability at internal pressures of between zero and 15 psi,
    wherein the tennis ball has a rebound within the range of 54.0 to 60.0 inches when dropped from a height of 100 inches onto a concrete floor.

2. The tennis ball of claim 1, wherein the tennis ball comprising the thermoplastic core conforms to ITF and USTA size, weight, deformation and rebound requirements.

3. The tennis ball of claim 1 wherein the core is non-inflatable.

4. The tennis ball of claim 1, wherein the core is valveless.

5. The tennis ball of claim 1, wherein the non-foamed thermoplastic core comprises one or more ethylene-alkene copolymers.

6. The tennis ball of claim 5, wherein the one or more ethylene-alkene copolymers comprises at least one ethylene-butene copolymer.

7. The tennis ball of claim 5, wherein the one or more ethylene-alkene copolymers comprises at least one ethylene-octene copolymer.

8. The tennis ball of claim 5, wherein the one or more ethylene-alkene copolymers comprises at least one ethylene-butene copolymer and at least one ethylene-octene copolymer.

9. The tennis ball of claim 6, wherein the thermoplastic core has a specific gravity of 0.862 to 0.880 and a flexural modulus of 4.0 to 22.1 MPa.

10. The tennis ball of claim 1, wherein the non-foamed thermoplastic core has a diameter within the range of 2.36 to 2.45 inches, and a weight within the range of 43.5 to 45.0 grams.

11. The tennis ball of claim 1, wherein the non-foamed thermoplastic core has a deformation of 0.24 to 0.28 inch, and wherein the non-foamed thermoplastic core has a rebound within the range of 67.0 to 71.0 inches.

12. A tennis ball comprising:
    a non-foamed thermoplastic core defining an internal volume, the core being entirely formed from a composition or compositions omitting rubber, the composition comprising:
        a thermoplastic material having a specific gravity of 0.86 to 1.38, a flexural modulus of 2.0 to 50.0 MPa, and a Shore D hardness of 10 to 70, a thickness of the thermoplastic material of between 3.0 and 8.0 mm, the thickness of the thermoplastic material configured to maintain dimensional stability at internal pressures of between zero and 15 psi,
    wherein the tennis ball has a diameter within the range of 2.670 to 2.70 inches, a weight of 56.0 to 59.4 grams, and a deformation of 0.220 to 0.290 inch pursuant to ITF and USTA specifications.

13. The tennis ball of claim 1, wherein the non-foamed thermoplastic core is pressurized to a non-zero internal pressure of up to 15 psi.

14. The tennis ball of claim 1, wherein the non-foamed thermoplastic core is not pressurized.

15. The tennis ball of claim 1, wherein the surface of the thermoplastic core is smooth across an entire outer spherical surface of the core.

16. A tennis ball comprising:
a non-foamed thermoplastic core defining an internal volume, the core comprising:
a thermoplastic material having a specific gravity of 0.86 to 1.38, a flexural modulus of 2.0 to 50.0 MPa, and a Shore D hardness of 10 to 70,
a thickness of the thermoplastic material of between 3.0 and 8.0 mm, the thickness of the thermoplastic material configured to maintain dimensional stability at internal pressures of between zero and 15 psi;
a raised wall molded as part of the core, wherein the raised wall is integrally formed with an outer layer of the core, wherein the core comprises a homogenous layer having an inner surface adjacent a hollow interior of the tennis ball, the homogeneous layer and the raised wall both being concurrently molded from a same homogenous thermoplastic material that omits rubber and wherein the raised wall is integrally molded and formed as part of a single unitary body with the homogeneous layer.

17. The tennis ball of claim 16, further comprising a felt material inset between portions of the raised wall projecting from the surface of the core.

18. The tennis ball of claim 16 further comprising a cover panel between the portions of the raised wall projecting from the surface of the core.

19. The tennis ball of claim 18, wherein the raised wall overhangs edges of the cover panel.

20. The tennis ball of claim 1 further comprising a felt cover at least partially covering the core.

21. The tennis ball of claim 20, wherein the felt cover comprises a woven fiber material.

22. The tennis ball of claim 20, wherein the felt cover comprises a needle-punch fiber material.

23. The tennis ball of claim 1, further comprising a non-felt material cover over the core.

24. The tennis ball of claim 1, wherein the core comprises an inner layer of a first material and an outer layer of a second material different than the first material.

25. A tennis ball comprising:
a non-foamed thermoplastic core defining an internal volume, the core comprising:
a thermoplastic material having a specific gravity of 0.86 to 1.38, a flexural modulus of 2.0 to 50.0 MPa, and a Shore D hardness of 10 to 70,
a thickness of the thermoplastic material of between 3.0 and 8.0 mm, the thickness of the thermoplastic material configured to maintain dimensional stability at internal pressures of between zero and 15 psi,
wherein the core comprises:
an inner layer of a first thermoplastic material having a first melting point;
an outer layer of a second thermoplastic material different than the first thermoplastic material and having a second melting point lower than the first melting point, wherein the outer layer is molded about the inner layer; and
a raised wall molded as part of the outer layer, wherein the raised wall has a third melting point lower than the second melting point.

26. The tennis ball of claim 25, wherein the second thermoplastic material omits rubber and wherein the outer layer continuously extends 360 degrees about the inner layer.

27. A tennis ball comprising:
a non-foamed thermoplastic core defining an internal volume, the core comprising:
a thermoplastic material having a specific gravity of 0.86 to 1.38, a flexural modulus of 2.0 to 50.0 MPa, and a Shore D hardness of 10 to 70,
a thickness of the thermoplastic material of between 3.0 and 8.0 mm, the thickness of the thermoplastic material configured to maintain dimensional stability at internal pressures of between zero and 15 psi; and
a raised wall molded as part of the core; and
a felt material inset between portions of the raised wall projecting from the surface of the core wherein an outer surface of the core is formed from the thermoplastic material, wherein the raised wall is formed from a second thermoplastic material, wherein the thermoplastic material has a first melting point, and wherein the second thermoplastic material has a second melting point lower than the first melting point.

28. The tennis ball of claim 12, wherein the tennis ball comprising the thermoplastic core conforms to ITF and USTA size, weight, deformation and rebound requirements.

29. The tennis ball of claim 16, wherein the tennis ball comprising the thermoplastic core conforms to ITF and USTA size, weight, deformation and rebound requirements.

30. The tennis ball of claim 25, wherein the tennis ball comprising the thermoplastic core conforms to ITF and USTA size, weight, deformation and rebound requirements.

31. The tennis ball of claim 27, wherein the tennis ball comprising the thermoplastic core conforms to ITF and USTA size, weight, deformation and rebound requirements.

* * * * *